(12) United States Patent
Hunter et al.

(10) Patent No.: US 7,323,986 B2
(45) Date of Patent: Jan. 29, 2008

(54) REUSABLE TAMPER RESPONDENT ENCLOSURE

(75) Inventors: Steve B. Hunter, Kinross (GB); Dale D. Murray, Mount Joy, PA (US); John A. Voltz, Hockessin, DE (US); Harold S. Wylie, Elkton, MD (US)

(73) Assignee: Gore Enterprise Holdings, Inc., Newark, DE (US)

( * ) Notice: Subject to any disclaimer, the term of this patent is extended or adjusted under 35 U.S.C. 154(b) by 0 days.

(21) Appl. No.: 10/933,714

(22) Filed: Sep. 3, 2004

(65) Prior Publication Data

US 2006/0049941 A1    Mar. 9, 2006

(51) Int. Cl.
*G08B 13/08* (2006.01)

(52) U.S. Cl. .................... 340/545.6; 53/449

(58) Field of Classification Search ............. 340/545.6, 340/541, 568.1; 53/449, 452, 458
See application file for complete search history.

(56) References Cited

U.S. PATENT DOCUMENTS

| | | | |
|---|---|---|---|
| 3,644,825 A | 2/1972 | Davis, Jr. ..................... 324/41 |
| 4,188,549 A | 2/1980 | Dorais ........................ 307/308 |
| 4,325,089 A | 4/1982 | Hsu ............................ 360/15 |
| 4,593,384 A | 6/1986 | Kleijne ....................... 365/228 |
| 4,860,351 A * | 8/1989 | Weingart ..................... 713/194 |
| 4,931,770 A * | 6/1990 | Abramson ................... 340/541 |
| 5,117,457 A * | 5/1992 | Comerford et al. ......... 713/194 |
| 5,832,772 A | 11/1998 | McEwan ...................... 73/290 |
| 5,858,500 A | 1/1999 | MacPherson ................ 428/68 |
| 6,396,400 B1 | 5/2002 | Epstein, III ................. 340/550 |
| 6,400,268 B1 | 6/2002 | Lindskog ..................... 340/550 |
| 6,606,123 B2 | 8/2003 | Mizuno ....................... 348/308 |
| 6,791,342 B2 * | 9/2004 | Ono ............................ 324/658 |
| 6,996,953 B2 * | 2/2006 | Perreault et al. .............. 53/449 |
| 7,005,733 B2 * | 2/2006 | Kommerling et al. ....... 257/679 |
| 2002/0092672 A1 | 7/2002 | Primavera ................... 174/250 |
| 2002/0171439 A1 | 11/2002 | Ono ............................ 324/658 |

FOREIGN PATENT DOCUMENTS

| | | |
|---|---|---|
| GB | 2 220 513 A | 1/1990 |
| GB | 2 256 956 A | 12/1992 |
| GB | 2 256 957 A | 12/1992 |
| GB | 2 256 958 A | 12/1992 |
| GB | 2 258 075 A | 2/1993 |
| GB | 2 270 785 A | 3/1994 |

\* cited by examiner

*Primary Examiner*—John Tweel, Jr.
(74) *Attorney, Agent, or Firm*—Allan M. Wheatcraft

(57) ABSTRACT

The present invention relates to a tamper respondent enclosure which may be opened and closed as many times as necessary. In particular, the present invention relates to a re-usable tamper respondent enclosure comprising a first sensing means and a second sensing means wherein the first sensing means detects any attempt to breach the enclosure or to compromise the second sensing means.

47 Claims, 11 Drawing Sheets

REUSABLE TAMPER RESPONDENT ENCLOSURE

FIELD OF THE INVENTION

The present invention relates to a tamper respondent enclosure which may be opened and closed as many times as necessary.

BACKGROUND OF THE INVENTION

The applicant has previously proposed a variety of forms of tamper resistant enclosures, such as those described in U.S. Pat. No. 5,858,500, and UK Patent Applications 2 220 513 A, 2 258 075 A, 2 256 956 A, 2 256 957 A, 2 256 958 A and 2 270 785 A, the disclosures of which are incorporated herein by reference. These enclosures are in the form of envelopes and shallow boxes, the walls of which are formed by folding flexible sheets incorporating tamper detection features. Included in such sheets are layers of flexible material including a matrix of semi-conductive lines printed on thin insulating film. The matrix of lines forms a continuous conductor which is broken if attempts are made to penetrate the film. The circuit is monitored by opening the conductor at one point and measuring the resistance between the two ends of the circuit. The sheets are folded and overlapped to create an enclosure of wedge-shaped, cuboid or cube form, such as disclosed in GB 2 258 075 A in which a laminate is folded about a plurality of fold lines to form an enclosure. In U.S. Pat. No. 5,858,500 the envelope or box formed of the flexible sheet is potted in a settable material. The enclosures are intended to surround an item to be protected, such as an electronic device, which may be an encryption module, chip or other circuit for processing, containing or carrying potentially valuable information. As noted above, any attempt to penetrate the enclosure results in damage to one or more of the lines, and this damage is detectable as a change in an electrical characteristic of the conductor. On detection of such a change the valuable information contained within the item is typically erased or destroyed and an alarm may be activated.

It is, however, a limitation of such an enclosure system that should access to any components within the enclosure be required e.g. for maintenance or replacement of components, the whole has to be reassembled and wrapped. The discussed tamper respondent enclosures also suffer from the limitation in that the enclosures may only be used once. This means that once the cover has been removed, the tamper respondent sensor has to be completely replaced. This adds to the cost of using such enclosures.

It is an object of at least one embodiment of the present invention to obviate or mitigate at least one or more of the aforementioned limitations.

It is a further object of at least one embodiment of the present invention to provide a tamper respondent enclosure which may be used more than once.

SUMMARY OF THE INVENTION

According to a first aspect of the present invention there is provided a re-usable tamper respondent enclosure comprising a first sensing means and a second sensing means wherein the first sensing means detects any attempt to breach the enclosure or to circumvent the second sensing means.

According to a second aspect of the present invention there is provided a tamper respondent enclosure comprising:

a casing adapted to be opened and closed;

a first sensing means comprising at least one detecting element, wherein damage to said at least one detecting element results in a detectable variation to a characteristic of the detecting element; and a second sensing means comprising at least one means for detecting opening of the casing;

wherein said casing is adapted to contain and protect at least one item disposed therein.

The enclosure has the advantageous property in that it may be opened for access, servicing and modification of an item enclosed within the casing. Preferably, the enclosure may be opened without causing damage to the first sensing means.

Typically, the tamper respondent enclosure may have two main forms of security, as indicated by the first and second sensing means. The first and second sensing means prevent unwanted access to an item contained within the casing.

Typically, the tamper respondent enclosure comprises:

(a) a casing having a top portion and an intermateable bottom portion;

(b) said first sensing means comprising a detecting element having a first portion wrapped at least partially around or within said top portion of said casing, and a second portion wrapped at least partially around or within said bottom portion of said casing, wherein damage to said detecting element results in a detectable variation to a characteristic of the detecting element; and (c) said second sensing means comprising at least one sensor and forming an electrical or electronic circuit including said sensor wherein the sensor is capable of detecting opening of the casing;

(d) wherein said casing is adapted to contain and protect at least one item disposed therein.

Typically, the tamper respondent enclosure comprises:

(a) a casing having an opening and adapted to be attached to a surface such that an item disposed on the surface is enclosed by the casing;

(b) a first sensing means comprising a detecting element wrapped at least partially around or within said casing, wherein damage to said detecting element results in a detectable variation to a characteristic of the detecting element; and (c) a second sensing means comprising at least one sensor and forming an electrical or electronic circuit including said sensor wherein the sensor is capable of detecting removal of the casing from said surface.

The first sensing means may detect any attempt to breach the casing. Conveniently, an attempt to breach the casing may damage the detecting element resulting in detectable change in a characteristic of the detecting element. Attempts to breach the casing may comprise any combination of puncturing, cutting, drilling, peeling, delaminating or chemical erosion.

The first detecting means may further detect any attempt to by-pass or otherwise circumvent the second sensing means, such as by mechanical intrusion to prevent the activation of the second sensing means.

The second sensing means may detect any attempt to open the casing. Typically, the opening of the casing may result in a sensing circuit being broken.

The second sensing means may comprise an intermateable connector.

The second sensing means may comprise a switch.

The second sensing means may comprise a proximity sensor.

The second sensing means may comprise a capacitance sensor.

The second sensing means may comprise a photosensitive device.

The second sensing means may comprise an acoustically responsive device.

The second sensing means may comprise a magnetically responsive device.

The second sensing means may comprise conductive contact pads on a surface.

The tamper respondent enclosure may be opened in a predetermined way without physical damage. The valuable information contained within the item may be erased upon opening by actuation of the second sensing means. The tamper respondent enclosure may be re-closed as required with full security functionality restored. If the said valuable information was erased upon opening the enclosure, said information would then need to be reloaded by the manufacturer or authorized technician after re-closing.

The casing may be of any suitable shape such as, but not exclusively, cubic, cuboidal, polyhedral, spherical, or hemispherical and may comprise a plurality of separate component parts.

In one embodiment of the invention the casing may comprise an open box-like section adapted to be attached to a planar surface such as a printed circuit board or the like on which the item to be protected is disposed. The casing would enclose such an item and any attempt to remove the casing from the planar surface would actuate the second sensing means.

The casing may comprise a plurality of separate component parts adapted to fit together.

In a further embodiment the casing may be formed from a first and second part which may be adapted to fit together. Typically, the first part may be an open-topped box-like section and the second part may be a lid section. The first and second parts may be fitted together to form a box-like casing. Alternatively, the casing may comprise a member, such as a door or doors, which may be moved between an open and closed position. In a further alternative, the casing may comprise a slidable member which may be slid between an open and closed position.

The casing material may be electrically conductive or nonconductive. Typically, the casing may be made from any material such as a metal, alloy or a polymeric material.

Conveniently, the casing may comprise additional protection means between separable parts of the casing to prevent unwanted access. For example, at least one of the component parts may comprise a multiple wall between separable parts of the casing. Preferably, the multiple wall section may be a double wall section. Such an arrangement may help to prevent unwanted probing within the casing, thereby gaining access to a stored item.

In one embodiment the items to be protected within the casing will be connected to other items internal to the casing, for example on a printed circuit board. Typically the connection will be through circuit traces within, or on, the printed circuit board. In another embodiment the items protected within the casing may be connected to devices or equipment external to the casing. Typically this connection will be through cables such as electrical conductor or optical fibre cables. In the routing of such cables from internal to external of the casing it is important to avoid any direct breaching of the casing or the tamper respondent covering thereby compromising the tamper protection provided by the casing. An example of such a routing, later herein described in detail, comprises the passage of a cable of suitable profile between the walls of the casing to exit in the gap between the internal and external walls of the casing. Such an arrangement causes the cable to take at least one 180° bend which prohibits a direct probing attack alongside the cable into the secure interior of the enclosure.

It may also be advantageous to incorporate a venting system in the casing to compensate for pressure changes due to temperature changes within the casing; or to compensate for pressure differential between the internal volume of the casing and the environment external to the casing such as would be experienced, for example, in aircraft or aerospace applications. A convenient way to provide such venting without breaching the casing would be to choose enclosure dimensions so as to provide a ventilation path of serpentine geometry (at least one 180° bend). Optionally, a tube such as a "lay-flat" tube may extend from inside of the casing to the outside. Such a tube may be routed in similar fashion to the aforesaid Interconnecting cable or ventilation path thereby avoiding breaching of the casing and the covering member. Having such a configuration on at least two sides of the enclosure would allow for an inlet and an outlet ventilation port and could incorporate forced airflow through the protected enclosure without loss of security.

In a further embodiment of the invention a heat pipe or any other suitable heat dissipation device may be incorporated to remove heat from a device within the enclosure and dissipate to the environment external of the enclosure. The heat pipe may be routed in a serpentine manner as for the aforesaid cables and ventilation tubes.

A ventilation path may also exist between internal and external sections of the casing.

The enclosure may also comprise an interconnecting cable.

Typically, at least part of the casing may comprise an outer covering member. The outer covering member may encompass substantially all of the outer surfaces of the casing. Alternatively, or additionally, the inner surfaces of the casing may be encompassed by the covering member.

The first sensing means may comprise a covering member covering at least part of the casing.

Preferably, the covering member may be bonded to an outer surface of the casing, an inner surface of the casing or both inner and outer surfaces. The bonding may be achieved by any appropriate means. For example, thermoplastic or thermosetting adhesives comprising tapes or sheets, or thermosetting dispensable liquid adhesive, or combinations of both, may be used. Pressure sensitive adhesives may also be used to bond the covering to a surface of the casing. Conveniently, the first sensing means comprises one or more detecting elements which may be incorporated or attached to the covering member. Where a plurality of elements is provided, each element may take a similar form or may take a different form. One or more elements may take the form of elongate electrical conductors formed of any appropriate material such as conductive or semi-conductive ink or a metal. One or more elements may take the form of conductive or reactive sheets forming layers or parts of layers of a laminated covering member. Preferably, the one or more detecting elements extend over substantially the whole area of the casing.

The covering member may be bonded to the surface of the casing using material which is utilised in the composition of the at least one detecting element.

The one or more detecting elements may be incorporated or attached to the covering member.

The at least one detecting element may have a cohesive strength and a bond between said detecting element and said covering member and a bond between said detecting element and said enclosure surface each having an adhesive strength, and said cohesive strength may be less than at least one of said adhesive strengths.

Typically, the one or more detecting elements may extend over substantially the whole area of the casing.

The characteristic of the detecting element may be electrical such as one or more of resistance, capacitance, impedance, inductance, reactance or the like. In use, the element preferably forms part of a monitored sensing electrical circuit across or through which a voltage or electrical signal may be applied or transmitted. Any attempt to penetrate the casing that alters said characteristic may thus be detected as, for example, a change in the measured voltage across the detecting element or a variation in a signal passed through the detecting element.

The one or more detecting elements may comprise a plurality of conductive tracks. The conductive tracks may be rectilinear or serpentine.

A protective coating or covering may be applied over the conductive tracks.

The detecting elements may be obscured by overprinting.

The one or more detecting elements may be provided on the face of the covering to be mounted to the surface of the casing. When the covering is adhered to a surface of the casing, any attempt to separate the covering from the surface will therefore disrupt or otherwise damage the elements. In other embodiments the one or more elements may be incorporated within the covering, and the covering adapted to delaminate or otherwise separate on an attempt to separate the covering member from the surface, such delamination disrupting or otherwise damaging the elements. Typically, the covering member may bend or flex to allow edges or parts of the member to be folded around the edges of the casing.

The covering member may initially be provided in a planar form and may then be folded around the casing to the appropriate form.

The covering member is preferably optically opaque. Typically, the covering member covers substantially all of the outside surface of the casing. Preferably the covering member and the sensing element disposed thereon comprise materials which are non-differentiable by X-ray radiography.

The covering member may be used with a metallised or otherwise treated cover to provide EMI shielding or ESD protection.

Preferably, the second sensing means may be within the casing where there may be provided a sensing circuit, or a plurality of sensing circuits comprising the at least one sensor for detecting opening of the casing. The one or more sensors may comprise surface contacts adapted to form electrical contact with corresponding surface contacts mounted within the casing. Those skilled in the art will appreciate that any type of suitable sensor may be adapted for use within the casing which is able to open and close an electrical circuit. For example, part of a connector system may be attached to a part of the casing which is openable and the mating part of the connector attached within the casing. On closing the casing, the connector system may form an electrical circuit. If the casing is opened, the electrical circuit may be broken, thereby detecting the opening of the casing. Alternatively, a switch such as a microswitch may be used which forms a circuit when the casing is closed and breaks a circuit when the casing is opened or, indeed, break a circuit when the casing is closed and form a circuit when the casing is opened.

The second sensing means may comprise other systems such as magnetically operated reed switches, Hall effect devices or other proximity devices known to one skilled in the art. Similarly photosensitive, magnetically sensitive, or acoustically sensitive devices could be utilised in the second sensing means. In an embodiment in which the casing is attached to a surface such as printed circuit board the second sensing means may comprise conductive contact pads connected to circuit traces on the surface of the printed circuit board.

Conveniently, the enclosure may be opened and closed for access, servicing and modification of an item enclosed therein. On opening, information held in any protected item within the enclosure may be 'zeroised'. On re-closing full functionality is restored to the enclosure without requiring new sensors to be fitted. The zeroised information would then be reloaded via circuit board traces, the I/O cables or connector. The opening and closing may be performed as many times as necessary.

Within the casing, there may be the at least one item to be contained and protected. The item may be an electronic device containing information in an electronic format. The information may be in the form of an algorithm, encryption codes, a program or the like. Preferably, the item contains information which it is desired to protect.

The item within the casing may be selected from but not limited to any of the following: items utilised in financial systems or transactions such as in banking, or in ticketing systems or machines; items utilised in the measurement of a commodity such as in electricity meters for reading, recording or transmitting electricity, gas or water; items utilised in encryption devices; items utilised in set-top boxes such as television set-top boxes; items or components utilised in hand-held terminals; items utilised in secure wireless communication systems or devices; items utilised in USB tokens; items utilised with electronic memory devices, for example RAM or ROM devices; items utilised in secure authentication tokens; items utilised in a PCMCIA card; items utilised in a motherboard; items utilised in a single board computer; devices used in weapons and aerospace control systems; biological material; mineralogical material; or hazardous material.

In a further embodiment of the invention the enclosure may be used to contain for storage or transportation items to which unauthorised access is undesirable. Items such as valuables, documents, biological samples, toxic substances or the like could be contained in the enclosure and any unauthorised attempts at access would trigger the first and/or second sensing means which may in turn activate an alarm system, data recorder or similar device.

Typically, any unwanted attempt to access the enclosure results in information stored on a contained item being erased or destroyed, activation of an alarm, activation of a recording device or any combination thereof.

According to a third aspect of the present invention there is provided a method of protecting at least one item comprising the steps of:

providing a casing adapted to be opened and closed and wherein at least one item may be stored and protected;

providing a first sensing means comprising at least one detecting element which is capable of detecting any damage to the detecting element by forming an electrical circuit including said detecting element and monitoring for detectable variations in a characteristic of the detecting element;

providing a second sensing means comprising at least one sensor and forming an electrical circuit including said sensor wherein the sensor is capable of detecting the opening of the casing;

whereby said detectable variations activate a system to erase or destroy information contained in the at least one item or to signal or otherwise notify of tampering.

Typically, detectable changes may also activate an alarm.

Although reference is made primarily herein to elements having certain electrical characteristics, those of skill in the art will recognise that elements having other detectable characteristics, for example, optical transmission characteristics, or surface acoustic wave propagation characteristics, may be utilised as an alternative or additional detection means.

BRIEF DESCRIPTION OF THE DRAWINGS

These and other aspects of the present invention will now be described, by way of example only, with reference to the accompanying drawings in which.

DETAILED DESCRIPTION OF THE DRAWINGS

Figure 1:
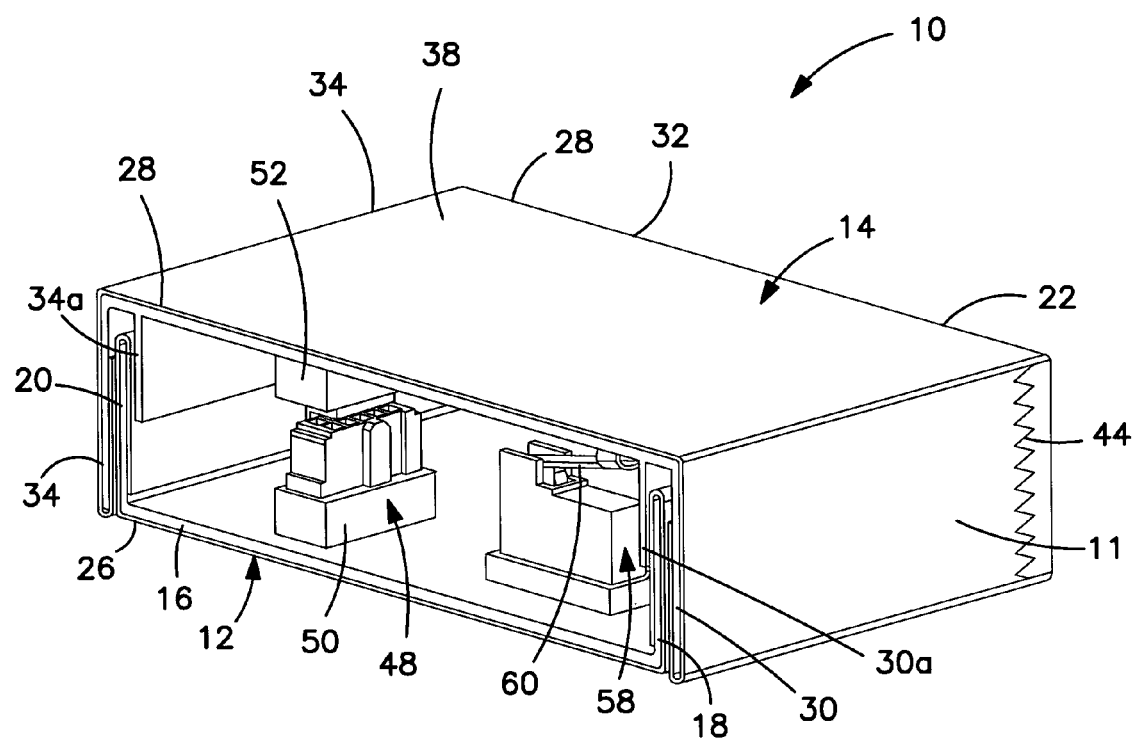
FIG. 1 is a schematic sectional perspective view of a tamper respondent enclosure according to an embodiment of the present invention.
Figure 2:
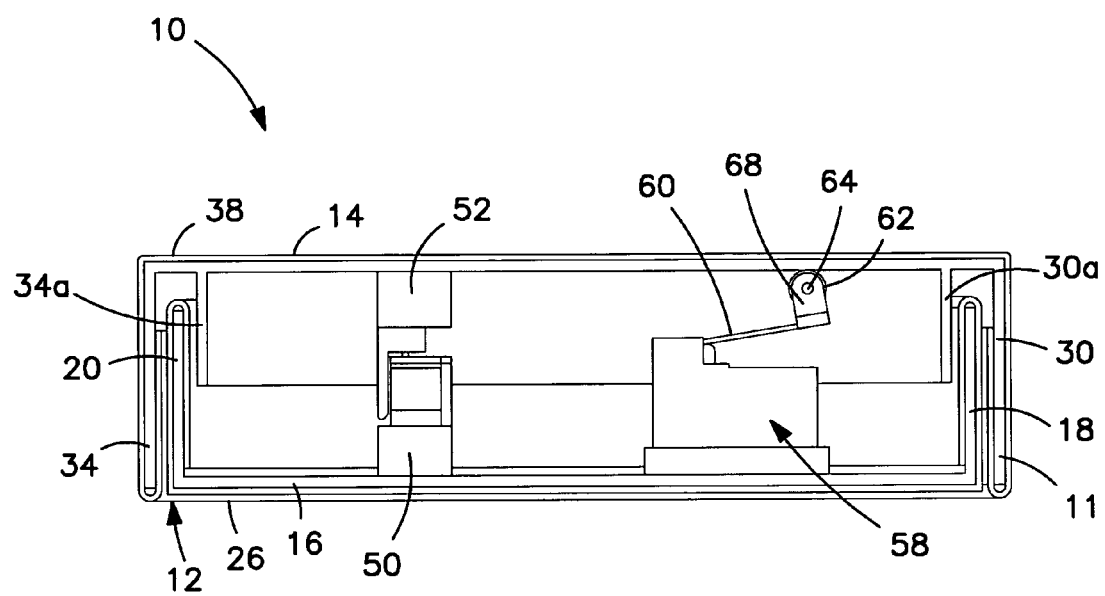
FIG. 2 is a schematic sectional side view of the tamper respondent enclosure of FIG. 1.

Referring to FIGS. 1 and 2, there is a tamper respondent enclosure, generally designated 10, in accordance with an embodiment of the present invention. The main body of the tamper respondent enclosure is formed by a casing 11. The casing 11 is substantially box-like in shape and comprises a bottom part, generally designated 12, and a top part, generally designated 14. The bottom and top parts 12,14 form a complete casing within which items (not shown) containing information, for example an encryption key, are contained. The items contain information which it is desired to protect.

Figure 3:
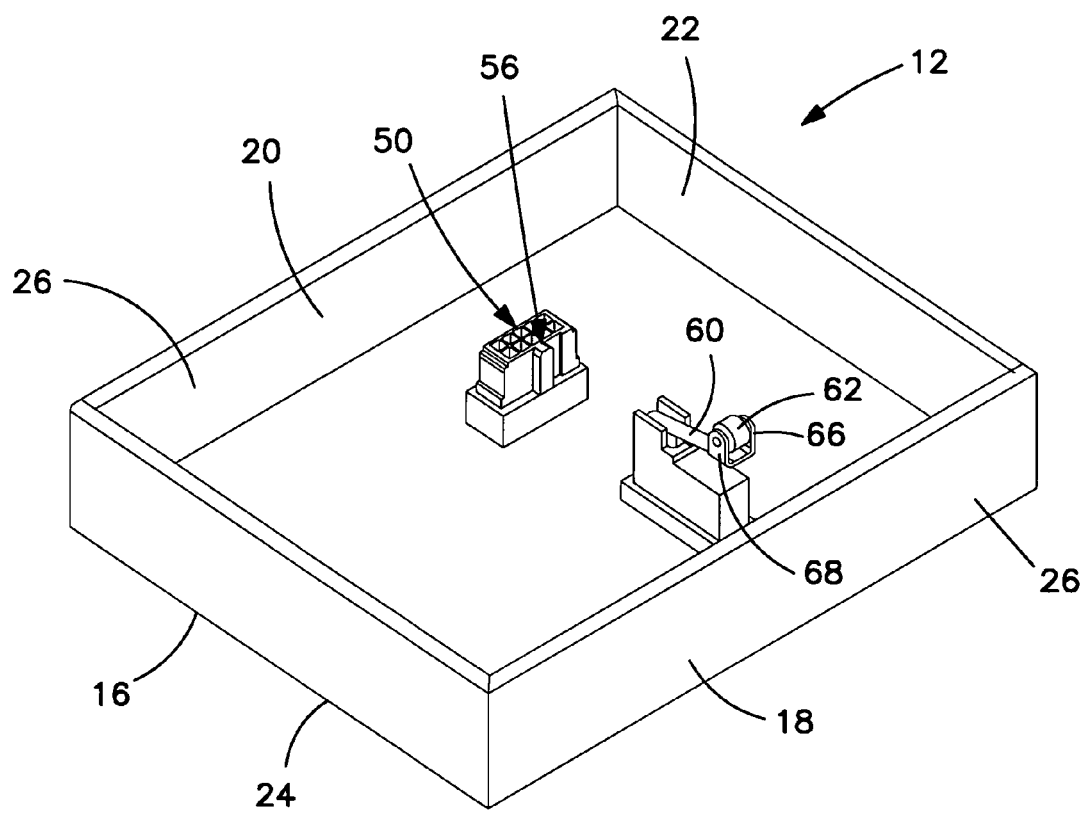
FIG. 3 is a schematic perspective view of a bottom part of a casing of the tamper respondent enclosure shown in FIGS. 1 and 2.

As shown in FIG. 3, the bottom part 12 forms an open-topped box and comprises a base 16 and four sides 18, 20, 22, 24. The bottom part 12 is formed from conductive metal. The outside surface of the base 16 and both the outer and inner facing surfaces of the four sides 18, 20, 22, 24 have a covering 26.

Figure 4:
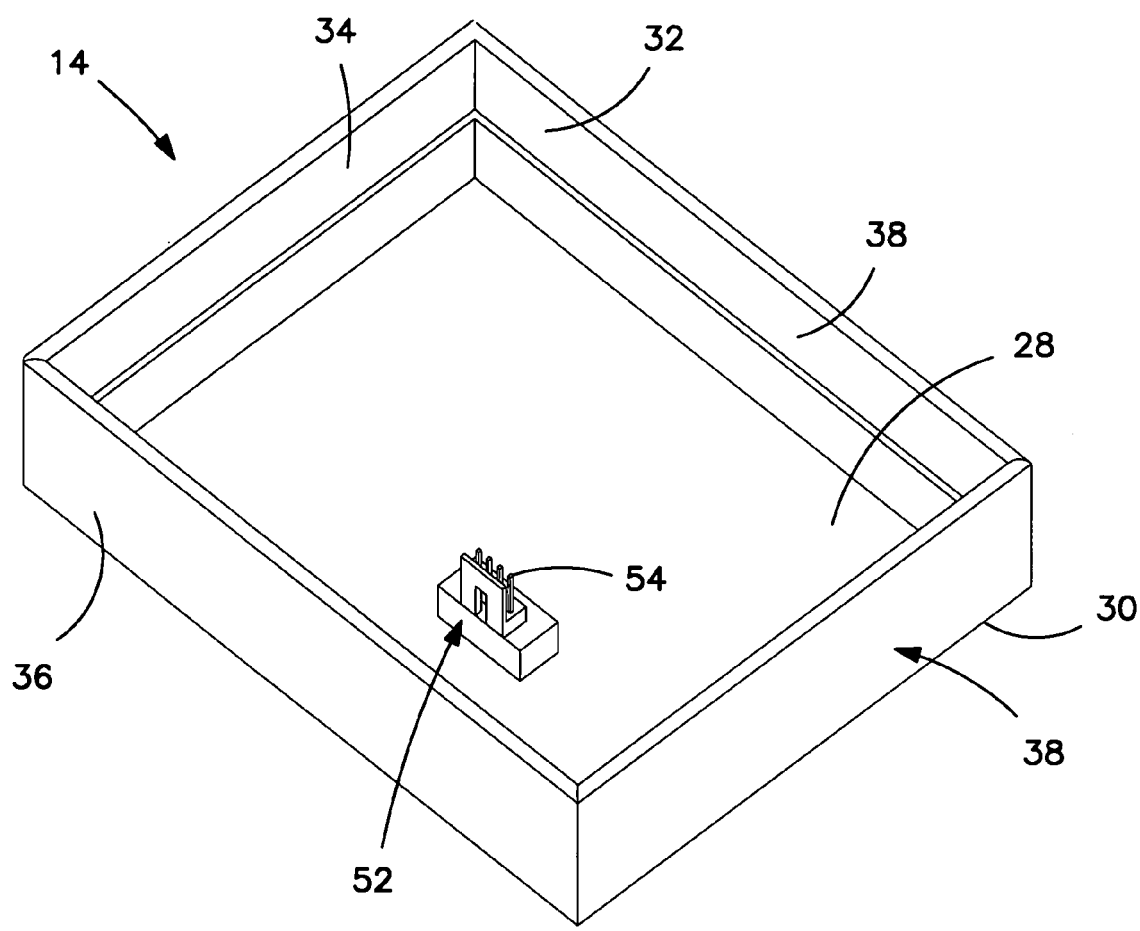
FIG. 4 is a schematic perspective view of a top part of a casing of the tamper respondent enclosure shown in FIGS. 1 and 2.

FIG. 4 is a representation of the top part 14. The top part 14 forms a lid and comprises a top 28 and four sides 30, 32, 34, 36. The top part 14 is formed from conductive metal. The outside surface of the top side 28 and both the outer and inner facing surfaces the four sides 30, 32, 34, 36 have a covering 38.

Figure 5:
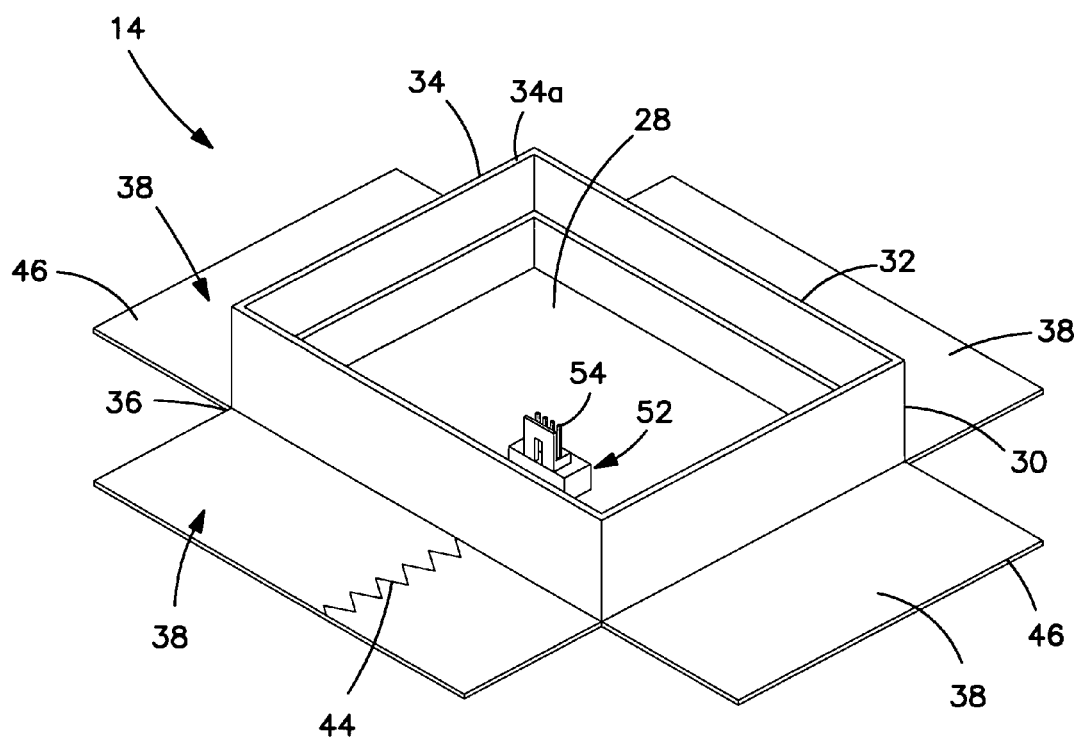
FIG. 5 is a schematic perspective view of the top part of the casing of the tamper respondent enclosure shown in FIG. 4 in an unwrapped form.
Figure 6:
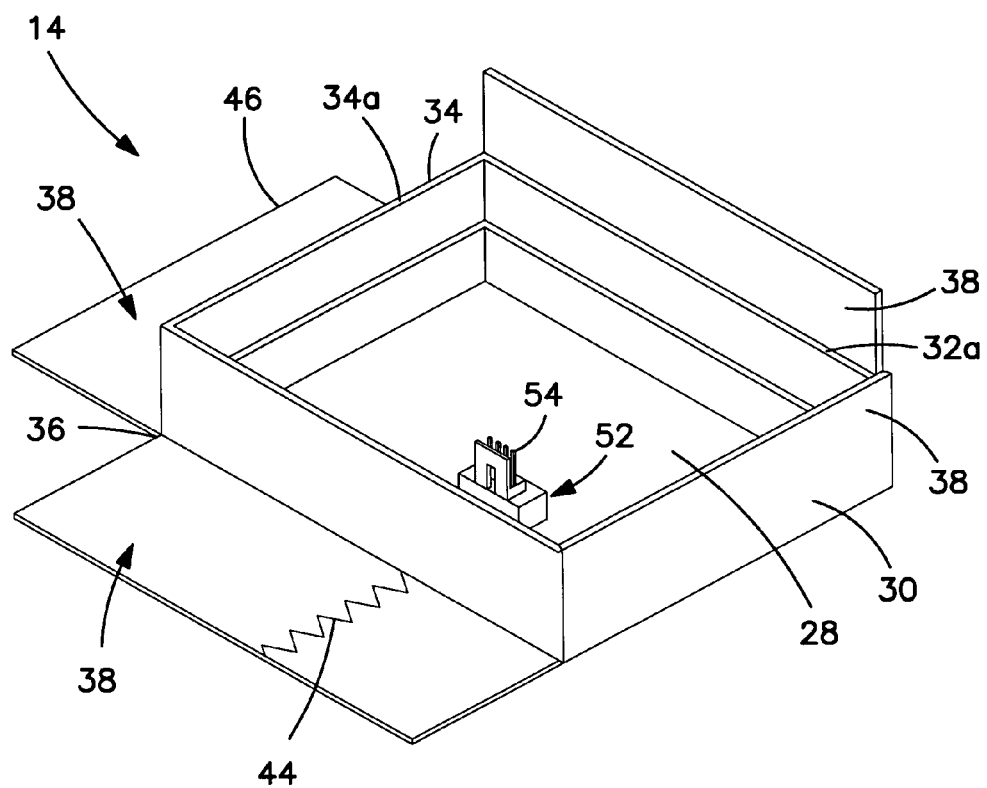
FIG. 6 is a schematic perspective view of the top part of the casing shown in FIG. 4 in a partially wrapped form.

FIGS. 5 and 6 show the wrapping of the covering 38 around the top 28 and the four sides 30, 32, 34, 36.

Figure 7:
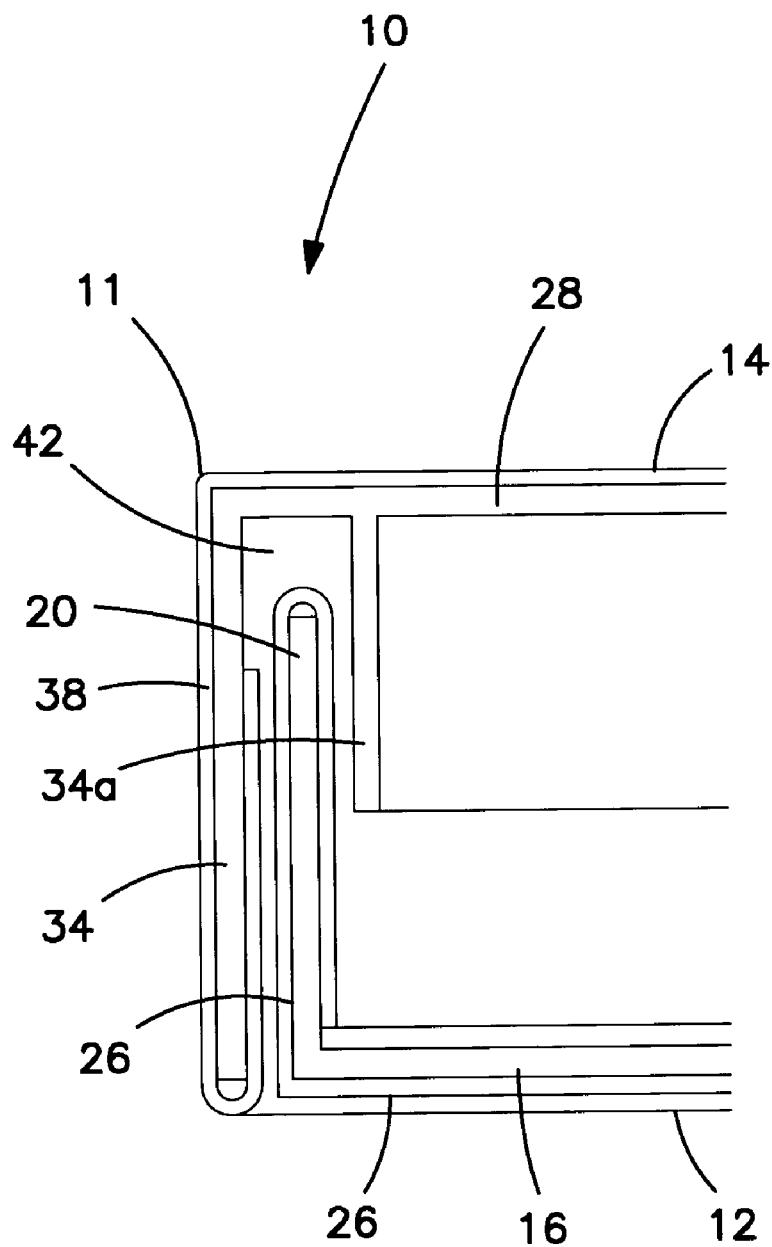
FIG. 7 is an enlarged sectional view of the attachment between the top and bottom parts of the tamper respondent enclosure shown in FIGS. 1 and 2.

FIGS. 2 and 7 clearly show that the top part 14 comprises in addition to the walls formed by sides 30, 32, 34, 36 a secondary set of sides 30a, 32a, 34a, 36a which extend around the top part 14 and are substantially parallel with sides 30, 32, 34, 36. Sides 30, 32, 34, 36 and sides 30a, 32a, 34a, 36a form a recess 42 therebetween into which the sides 18, 20, 22, 24 of the bottom part 12 may fit. Sides 30a, 32a, 34a, 36a function as a guard rail and prohibit probing into the inside of the casing 11 when closed.

The covering 26,38 for the bottom and top parts 12, 14 is initially formed in a planar configuration by printing resistive ink tracks 44 onto both sides of a suitable flexible substrate 46, the substrate 46 being formed of a material such as a polyester, for example, PET. The substrate 46 may be laser-drilled at various points to permit electrical connections to be formed through the substrate 46. Although only one track 44 is shown in FIGS. 1, 5 and 6 for illustration purposes, the tracks 44 are preferably printed in a tight rectilinear pattern and are arranged to provide complete coverage, or "blackout", such that any hole of even relatively small dimensions subsequently made in an attempt to breach enclosure 10 will break or damage at least one track 44.

The tracks 44 are formed of a carbon-loaded polyester and are black in colour. The tracks 44 may thus be obscured by overprinting the tracks 44 with a thin layer of black polymer resin, or an opaque cover film which is fixed by adhesive to the outer phase of the substrate 46.

An adhesive layer is used to fix the covering 26,38 to the bottom and top parts 12,14. For simplicity in figures 5 and 6 covering 38 is shown cut to form butt joins at the vertical edges when wrapped round the casing but in practice this arrangement would leave the corners vulnerable to undetected attack. It is therefore preferable for the covering 38 to be cut such that the covering would overlap at the vertical edging in an anti- probing fold arrangement.

The tracks 44 form part of an electrical circuit through which a voltage is applied. Monitoring means detect any change in the voltage. Any change in voltage results in information in a stored item being erased or destroyed.

The covering 26,38 thus provides a relatively simple and inexpensive means of protecting an enclosed item.

FIGS. 1, 2, 3, and 4 also show two alternative and exemplary switches which are suitable for mounting within the enclosure 10 as the second sensing means. (Although the two alternative embodiments are both shown in FIGS. 1-3, a single one may be used with the invention in practice; or alternatively, a plurality of such second sensing means may be used).

The first switch 48 comprises a first part 50 mounted on base 16 of bottom part 12. The second part 52 is mounted on the inside surface of top side 28 of top part 14. The second part 52 comprises pins 54 which are adapted to be inserted into sockets 56 in the first part 50. On insertion of the pins 54 into the sockets 56, an electrical connection is made and a circuit is formed. If the top part 14 is removed from the bottom part 12, the electrical connection formed by switch 48 and the resulting circuit is broken whereupon information stored in protected items are erased or destroyed.

Switch 58 comprises a spring-mounted arm 60. At the end of arm 60 there is a contact roller 62 mounted on a pin 64 between two ends 66,68. As the top part 14 is inserted on top of the bottom part 12, the spring-mounted arm 60 abuts against the top side 28 of the top part 14 and is forced downwards. This switches the switch 58 'on'.

If the top part 14 is removed, the spring-mounted arm 60 rises, and switch 58 is switched 'off'. The circuit is broken and the information within the item is erased or destroyed.

If a wireless communication device, such as used in WLAN (wireless local area network) or RFID (radio frequency identification) systems were incorporated, a tamper attack on the enclosure could trigger the RF transponder to emit a notification signal. If the wireless communication device were housed inside the casing, a tamper respondent covering with conductive tracks may attenuate the emitted RF signal. Preferably, the conductive tracks in the tamper respondent covering are highly resistive which will absorb less RF energy than highly conductive tracks. A material such as semi-resistive carbon ink is preferred over conductive silver traces.

On removal of the top part 14 from the bottom part 12, the tamper respondent enclosure 10 can be reset. This allows access, servicing and modification of the item to be performed within the casing 11. The top part 14 may then be placed on top of the bottom part 12 again and the tamper respondent enclosure may be reset, ready for further use. Such an enclosure 10 has the advantage that none of the sensors need to be replaced on opening and closing. This is in contrast to prior art devices which can only be used once.

Figure 8:
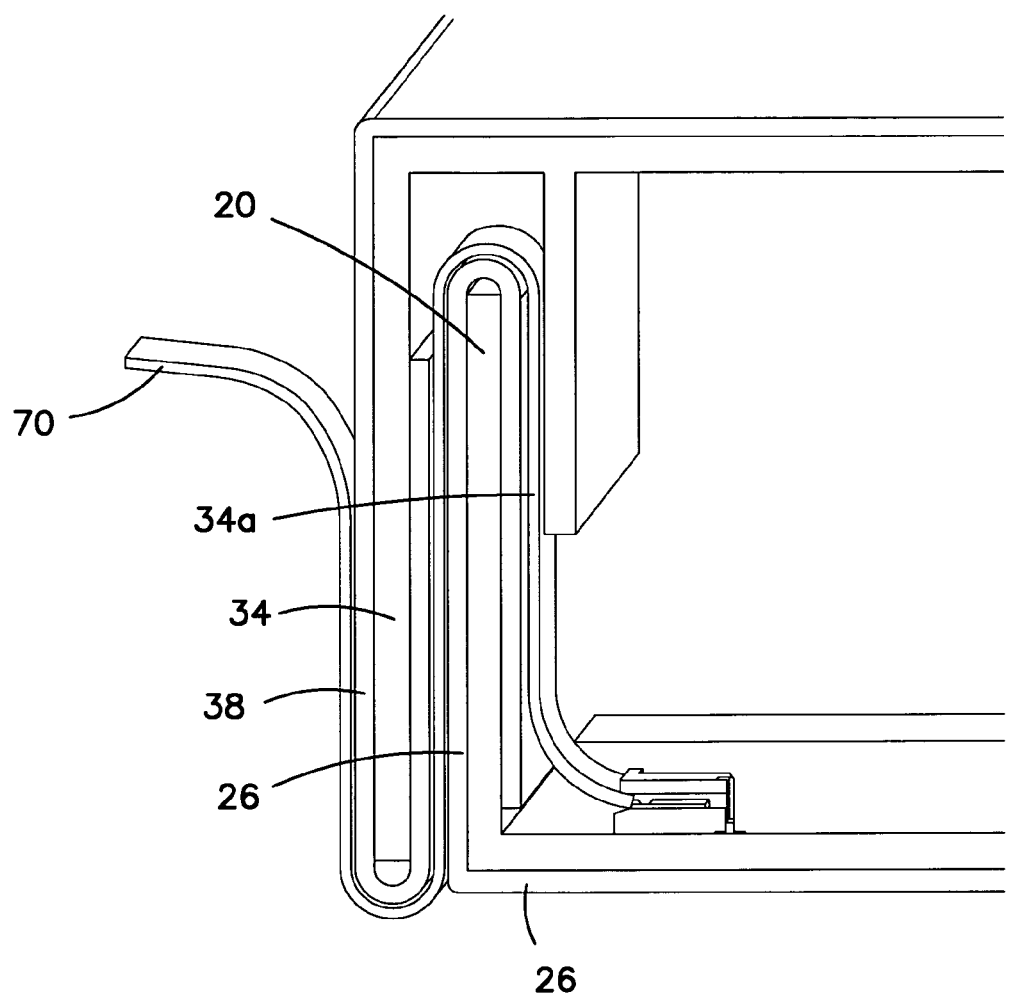
FIG. 8 is an enlarged sectional view as in FIG. 7 illustrating the routing of an interconnecting cable between a device or devices within the enclosure to devices or equipment external of the enclosure without compromising the tamper protection provided by the enclosure.

FIG. 8 illustrates a routing of interconnecting cable 70 exiting the enclosure 10 which avoids breaching the covering, and thereby compromising the protection provided by the covering. The interconnecting cable 70 between the items within the casing and any equipment or device external to the casing is routed between the guard rail 34a and the covered side 20, downwards between covered side 20, and covered side 34, to exit the casing around the bottom edge of covered side 34.

A venting tube utilised to equalise gas pressure between the inside of the casing and the environment external to the casing may be similarly routed to avoid breaching the casing and the tamper respondent covering of the casing.

Figure 9:
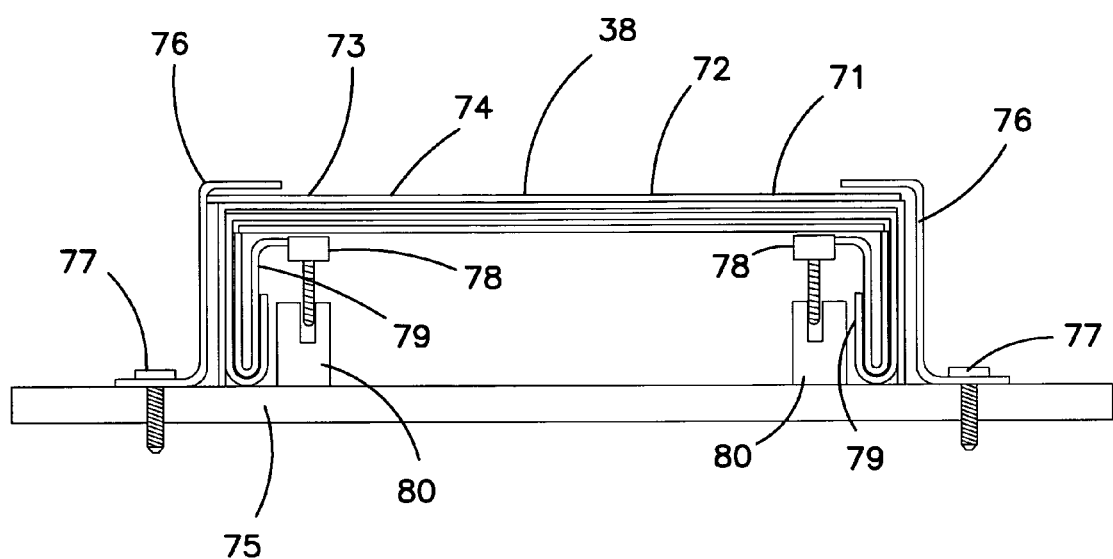
FIG. 9 is a schematic sectional view of a tamper respondent enclosure according to a further embodiment of the present invention.

FIG. 9 represents a cross section of a further embodiment of the enclosure of the invention comprising a box-like casing 71 wrapped with tamper respondent covering 38 comprising sensor layer 72 (the first sensing means), adhesive layer 73 and obscuring layer 74. The wrapped casing is removably attached to planar substrate 75 by mechanical clamps 76 which are secured to the substrate by screws 77. The detecting elements on sensor layer 72 are connected through cables 79 to connector headers 78 which are mechanically attached to casing 71. Connector mating parts 80 are coupled to an appropriate monitoring circuit, and combined with the connector headers 78, comprise the second sensing means. Any attempt to remove the casing from the substrate will disconnect the headers 78 from their mating parts and thereby trigger the tamper detection circuit or device. Although for clarity only two connector systems are shown it will be obvious to one skilled in the art that a plurality of such systems could be utilised, distributed around all sides of the enclosure to optimise tamper respondent sensitivity. It is also obvious that such connector systems could be replaced by proximity devices and the like for the second sensing means.

Figure 10:
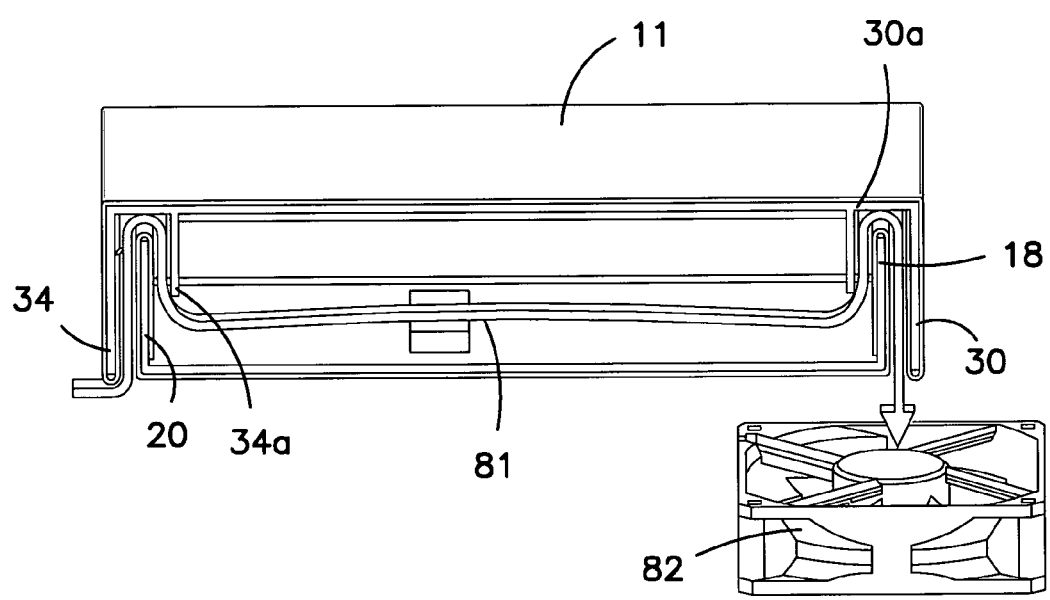
FIG. 10 is a schematic sectional view of an embodiment of the present invention illustrating a possible ventilation path through the enclosure.

FIG. 10 is a schematic cross section of an embodiment of the invention which illustrates how, by selecting appropriate dimensions of the embodiments shown in FIGS. 1 to 7, ventilating or cooling fluid can have a flow path through the enclosure without compromising the tamper respondent feature of the enclosure. Arrow 81 is a general representation of the flow path of the fluid through the enclosure. Ventilating air drawn by fan 82, which is in fluid connection with the space between walls 18 and 30 of casing 11, follows a serpentine path defined by walls 20, 34, and 34a of casing 11 passes through the enclosure and exits via the serpentine path formed by walls 18, 30, and 30a of casing 11.

Figure 11:
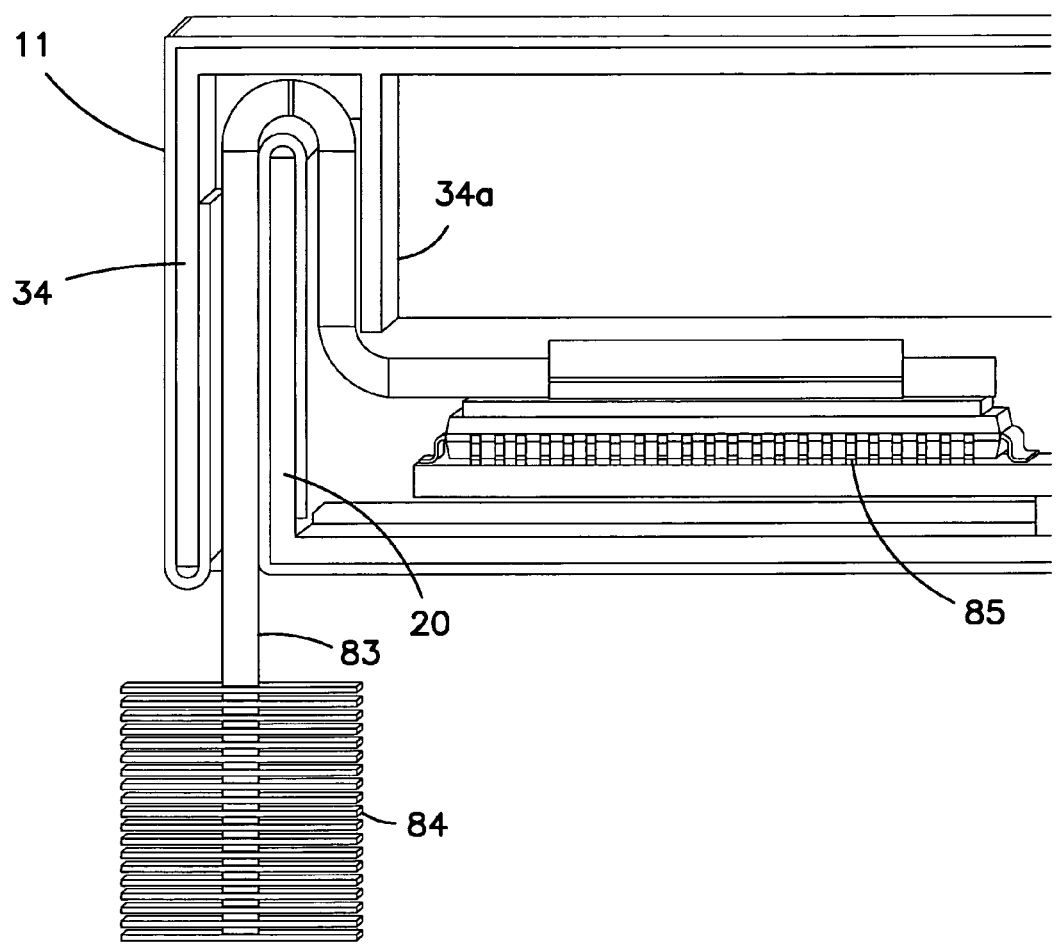
FIG. 11 is a schematic part sectional view of a further embodiment of the present invention incorporating a heat pipe to remove dissipated heat from an item within the enclosure.

FIG. 11 is a schematic representation of an embodiment of the invention which comprises a heat pipe to remove heat from a device within the enclosure. Heat pipe 83, connected to heat sink element 84, passes in a serpentine manner between the walls 20, 30, 34a of casing 11 and is attached to device 85.

The present invention has application in many areas where it is desired to protect an item, including devices or items utilised in any of the following: financial systems or transactions such as in banking, or in ticketing systems or machines; items concerned with measurement of a commodity, such as in electricity meters for reading, recording or transmitting electricity, gas or water; or in many other items including but not limited to encryption devices, set-top boxes such as television set-top boxes, hand-held terminals, secure wireless communication devices, USB tokens, electronic memory devices such as EPROMs/PROMs or RAMS, secure authentication tokens, part of PCMCIA card, or part of a motherboard or single board computer. The tamper respondent enclosures of the present invention may also be used in military applications such as weapon systems or aerospace control systems; and protecting biological material, mineralogical material or hazardous material.

Furthermore the tamper respondent enclosures of the present invention may be used as "smart containers" i.e. to protect items, during storage or transport, from unauthorised access and to record and/or provide notification of attempts at such unauthorised access.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A tamper respondent enclosure comprising:
   (a) a casing having an opening and adapted to be attached to a surface such that an item disposed on the surface is enclosed by the casing;
   (b) a first sensing means comprising a detecting element wrapped at least partially around or within said casing, wherein damage to said detecting element results in a detectable variation to a characteristic of the detecting element; and
   (c) a second sensing means comprising at least one sensor and forming an electrical or electronic circuit including said sensor wherein the sensor is capable of detecting removal of the casing from said surface;
   (d) wherein at least one detecting element has a cohesive strength and a bond between said detecting element and a covering member and a bond between said detecting element and an enclosure surface each have an adhesive strength, and said cohesive strength is less than at least one of said adhesive strengths.

2. A tamper respondent enclosure according to claim 1, where in attempts to breach the casing comprise any combination of puncturing, cutting, drilling, peeling, delaminating or chemical erosion.

3. A tamper respondent enclosure according to claim 1, wherein the second sensing means uses a sensing circuit to detect any attempt to open the enclosure.

4. A tamper respondent enclosure according to claim 1, wherein the second sensing means comprises an intermateable connector.

5. A tamper respondent enclosure according to claim 1, wherein the second sensing means comprises a proximity sensor.

6. A tamper respondent enclosure according to claim 1, wherein the second sensing means comprises a capacitance sensor.

7. A tamper respondent enclosure according to claim 1, wherein the second sensing means comprises a photosensitive device.

8. A tamper respondent enclosure according to claim 1, wherein the second sensing means comprises an acoustically responsive device.

9. A tamper respondent enclosure according to claim 1, wherein the second sensing means comprises a magnetically responsive device.

10. A tamper respondent enclosure according to claim 1, wherein the second sensing means comprises conductive contact pads on said surface.

11. A tamper respondent enclosure according to claim 1, wherein the casing comprises a plurality of separate component parts adapted to fit together.

12. A tamper respondent enclosure according to claim 1, wherein the casing is conductive.

13. A tamper respondent enclosure according to any of claims 11 or 12, wherein at least one of the component parts comprises a multiple wall between separable parts of the casing.

14. A tamper respondent enclosure according to claim 1, wherein the first sensing means comprises a covering member covering at least part of the casing.

15. A tamper respondent enclosure according to claim 1, wherein an outer covering member encompasses substantially all of the outer surfaces of the casing.

16. A tamper respondent enclosure according to claim 1, wherein an outer covering member is bonded to an outer surface of the casing.

17. A tamper respondent enclosure according to claim 1, wherein an outer covering member is bonded to a surface of the casing using the material which is utilised in the composition of the at least one detecting element.

18. A tamper respondent enclosure according to claim 1, wherein one or more detecting elements are incorporated or attached to a covering member.

19. A tamper respondent enclosure according to claim 1, wherein one or more detecting elements take the form of elongate electrical conductors formed of conductive or semi-conductive ink or a metal.

20. A tamper respondent enclosure according to claim 1, wherein one or more detecting elements take the form of conductive or reactive sheets forming layers or parts of layers of a laminated covering member.

21. A tamper respondent enclosure according to claim 1, wherein one or more detecting elements extend over substantially the whole area of the casing.

22. A tamper respondent enclosure according to claim 1, comprising one or more detecting elements wherein a characteristic of the detecting element is electrical and is selected from one or more of resistance, capacitance, impedance and inductance or reactance.

23. A tamper respondent enclosure according to claim 1, wherein one or more detecting elements comprise a plurality of conductive tracks.

24. A tamper respondent enclosure according to claim 23, wherein conductive tracks are rectilinear or serpentine.

25. A tamper respondent enclosure according to claim 1 wherein a protective coating or covering is applied over detecting elements comprising a plurality of conductive tracks.

26. A tamper respondent enclosure according to claim 1 wherein detecting elements are obscured by overprinting.

27. A tamper respondent enclosure according to claim 1, wherein a device or item to be protected contains information in electronic format.

28. A tamper respondent enclosure according to claim 27, wherein the information comprises an algorithm, encryption codes, a program or the like.

29. A tamper respondent enclosure according to claim 1, wherein a device or item within a casing is a component of a financial transaction system.

30. A tamper respondent enclosure according to claim 1, wherein a device or item within a casing is a component of a ticketing system.

31. A tamper respondent enclosure according to claim 1 wherein a device or item within a casing is a component of commodity measurement system.

32. A tamper respondent enclosure according to claim 1, wherein a device or item within a casing is a component of an encryption device.

33. A tamper respondent enclosure according to claim 1, wherein a device or item within a casing is a component of a television set-top box.

34. A tamper respondent enclosure according to claim 1, wherein a device or item within a casing is a component of a hand held terminal.

35. A tamper respondent enclosure according to claim 1, wherein a device or item within a casing is a component of a secure wireless communication system.

36. A tamper respondent enclosure according to claim 1, wherein a device or item within the casing is a component of a USB token.

37. A tamper respondent enclosure according to claim 1, wherein a device or item within the casing is an electronic memory device.

38. A tamper respondent enclosure according to claim 1, wherein a device or item within a casing is a secure authentication token.

39. A tamper respondent enclosure according to claim 1, wherein a device or item within a casing is a component of PCMCIA card.

40. A tamper respondent enclosure according to claim 1, wherein a device or item within a casing comprises biological material.

41. A tamper respondent enclosure according to claim 1, wherein a device or item within a casing comprises mineralogical material.

42. A tamper respondent enclosure according to claim 1, wherein a device or item within a casing comprises hazardous material.

43. A tamper respondent enclosure according to claim 1, comprising a path for a heat pipe or other heat dissipation device which exits a casing.

44. A tamper respondent enclosure according to claim 1, comprising a ventilation path between internal and external sections of a casing.

45. A tamper respondent enclosure according to claim 1, comprising an interconnecting cable.

46. A tamper respondent enclosure according to claim 1 further comprising a wireless communication device within said enclosure.

47. A tamper respondent enclosure according to claim 46, wherein said first sensing means is capable of allowing a RF signal to pass through it.

* * * * *